Oct. 14, 1941.  W. G. LUNDQUIST  2,259,112
PLANETARY GEAR
Filed Sept. 2, 1939
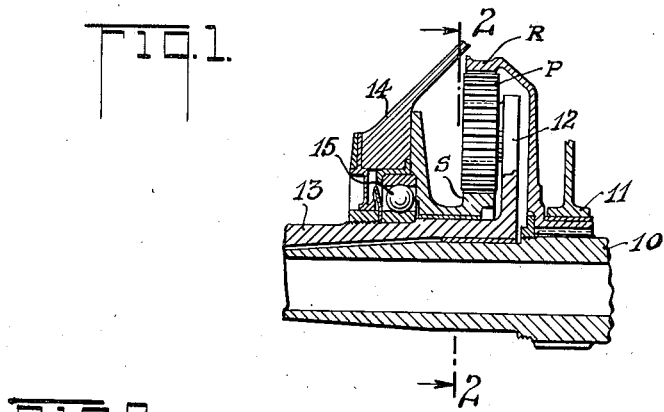
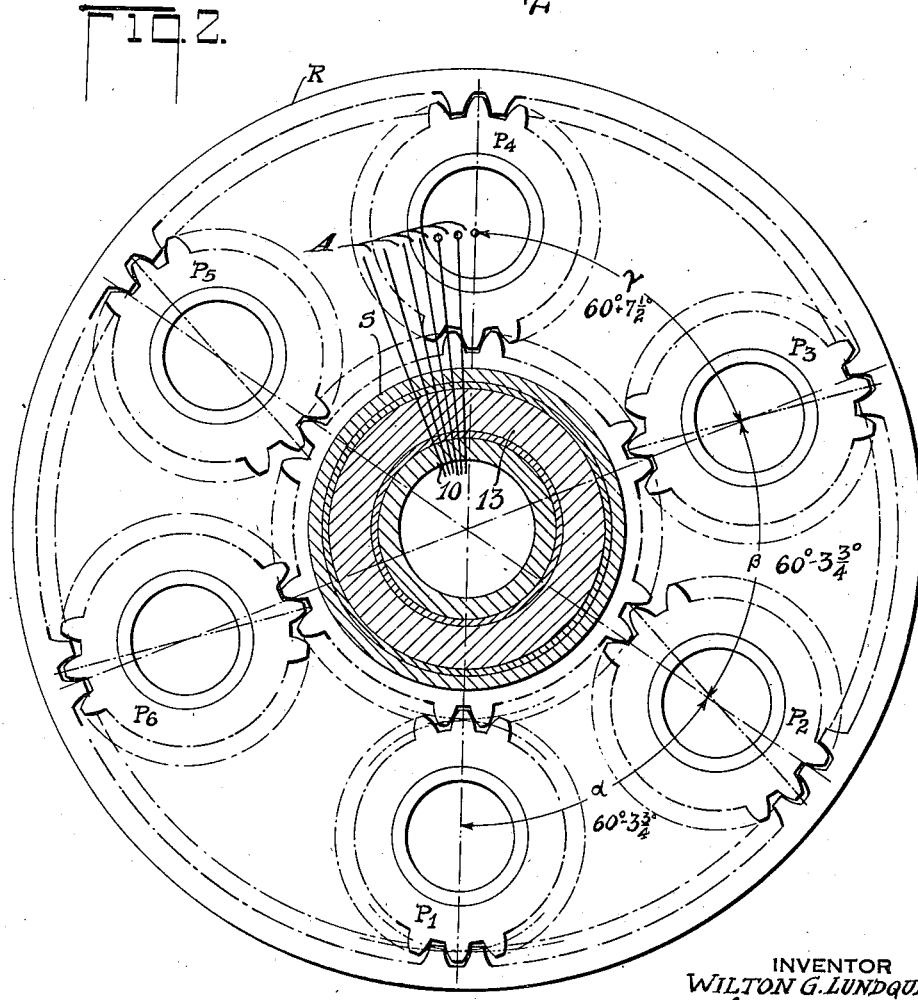
INVENTOR
WILTON G. LUNDQUIST
BY
ATTORNEY Patented Oct. 14, 1941

2,259,112

UNITED STATES PATENT OFFICE 2,259,112

PLANETARY GEAR

Wilton G. Lundquist, Hohokus, N. J., assignor to Wright Aeronautical Corporation, a corporation of New York Application September 2, 1939, Serial No. 293,240

5 Claims. (Cl. 74—305)

This invention relates to gearing, being particularly concerned with improvements in the arrangement of planetary gearsets.

The invention deals with that type of gearset which comprises a ring gear, a sun gear, and a plurality of planet pinions meshed therewith and carried by a spider. One of the three elements of the gearset is fixed, while the other two comprise the driving and driven members. The conventional practice in a gearset of this type includes the use of a number of planet pinions, which number is a whole number factor of the number of teeth in the sun gear and of the number of teeth in the ring gear. The pinions are usually spaced apart uniformly; that is: The angle between the centers of adjacent pinion journals is 360° divided by the number of pinions. This causes all pinions to be in an identical phase of tooth mesh with both the sun and ring gears, and may result in the production of vibration synchronous with tooth numbers in the gearing. If the phase of tooth mesh in the several pinions can be made different, vibration characteristics are improved and also, the capacity of the gearset is increased since a greater number of gear teeth will be engaged at all times, since the number of gear teeth engaged must change from one to two in each gear engagement. In the conventional gear the change from one to two takes place simultaneously with all pinions, while with a staggered phase relation of the teeth, the change from one to two will occur at different intervals with different pinions.

An object of this invention is to provide means for staggering pinion tooth engagements, a related object being to effect the tooth stagger in conventional gearsets merely by changing the angles between adjacent pinions to cause non-uniform rather than uniform spacing.

Further objects will become apparent in reading the annexed detailed description in connection with the drawing in which, Fig. 1 is a longitudinal section through a typical gearset, and, Fig. 2 is an enlarged layout of the gear arrangement according to the invention.

Both Figures 1 and 2 show the same general type of gearset in which R is a driven ring gear splined to a power shaft 10 borne in a bearing 11. The ring gear meshes with a plurality of pinions P borne on a spider 12 integral with a driven shaft 13. The pinions mesh with a fixed sun gear S secured to a casing 14 within which the shaft 13 is borne at a bearing 15. In general, Fig. 1 shows the conventional reduction gear of an aircraft engine.

In the typical gear shown, the ring gear is provided with 66 teeth, the sun gear with 30 teeth, and each of the six pinions numbered consecutively P1 to P6, with 18 teeth each. Ordinarily, the pinion spacing between adjacent pinions would be 60°, in which case all pinions would be in the same phase of mesh. Now, if space permitted, a very large number of pinions could be meshed between the ring gear and sun gear, and the angular spacing A thereof would be represented by 360° divided by the sum of the tooth numbers of R and S. In the embodiment shown this spacing would be 3¾°, and the number of pinions so spaced would be 96. The number of angular spacings A which would occur between similar tooth engagements of a pinion rolling from one tooth to the next on S would be 3, since the angular travel of the pinion axis in rolling from one tooth to the next would be 360° divided by the number of teeth in S, or 12°. This indicates that there are three phases of tooth engagement possible in the gear shown, each phase being spaced 3¾° from the next. Thus, if we assume six pinions in the gear, staggered tooth engagement may be obtained by spacing P2 from P1 by an angle of 60°–3¾°, or 56¼° shown by the angle α. To obtain the next phase of tooth engagement, P3 may be spaced from P2 60°–3¾°, or 56¼°, shown by the angle β, the remaining angle γ, being 180° minus α minus β amounting to 67½°. This uses up all phases of tooth engagement for these three pinions so the pinions P4, P5, and P6 may be respectively placed 180° away from the pinions P1, P2, and P3. In so spacing the second set of pinions, pinions P1 and P4 will balance one another, pinions P2 and P5 will balance, and pinions P3 and P6 will balance.

In the general application of the invention where $n$ is the number of pinions, the angle between pinions will be $$\frac{360}{n} \pm KA$$

where K is a whole number factor such as 1, 2, 3, etc. If space permits the use of a large number of pinions in the same plane or if overlapped pinions are to be used, the same general practice may be followed, wherein pinions can be spaced to obtain all possible tooth engagements and may likewise be arranged symmetrically to obtain proper balance of the planet system.

A gearset constructed according to the principles indicated above will be free from the vibration characteristics encountered in conventional gears, and will likewise have an increased load capacity due to the divergent intervals of tooth engagements between the sun and ring gears and the planets.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a planetary gearset comprising a sun gear and a ring gear, a spider concentric therewith carrying pinions engaging said gears, the number of pinions being factorable into the tooth numbers of the ring gear and sun gear, and the pinions being unequally spaced apart so as to provide staggered engagement of the teeth of the pinions with the teeth of said gears.

2. In a planetary gearset comprising a sun gear and a ring gear, a spider concentric therewith carrying a plurality of pinions engaging said gears, said pinions being non-uniformly spaced apart circumferentially to provide staggered engagement of the pinion teeth with the teeth of the gears, the number of pinions comprising a whole number factor of the number of teeth in each gear.

3. In a planetary gearset comprising ring and sun gears, a member having N pinions thereon the pinions being meshed with the gears and N being a whole number factor of the tooth numbers of each of the sun and ring gears, journals for said pinions on the member spaced non-uniformly so that the angle between adjacent journals is different from the value $$\frac{360°}{N}$$

4. In a planetary gearset comprising sun and ring gears, a planet spider having a number of pinions factorable as a whole number into the tooth numbers of the sun and ring gears individually, whose pinion journals are non-uniformly spaced apart so that when one pinion has one phase of tooth engagement with the sun and ring gear teeth, other pinions have different phases of tooth engagement with the sun and ring gear teeth.

5. In a planetary gearset, a ring gear and a concentric sun gear, a set of pinions of a number N which comprises a whole number factor of the number of teeth in each gear, and a spider having journals for said pinions unequally spaced apart so as to provide N phases of tooth engagement for said pinions, said phases being in equal increments.

WILTON G. LUNDQUIST.